US011670926B2

(12) United States Patent
Mortun

(10) Patent No.: US 11,670,926 B2
(45) Date of Patent: Jun. 6, 2023

(54) ELECTRICAL RECEPTACLE COVER

(71) Applicant: Hubbell Incorporated, Shelton, CT (US)

(72) Inventor: Sorin Ioan Mortun, Irvington, NY (US)

(*) Notice: Subject to any disclaimer, the term of this patent is extended or adjusted under 35 U.S.C. 154(b) by 0 days.

(21) Appl. No.: 17/393,641

(22) Filed: Aug. 4, 2021

(65) Prior Publication Data

US 2021/0367412 A1  Nov. 25, 2021

Related U.S. Application Data

(62) Division of application No. 16/596,318, filed on Oct. 8, 2019, now Pat. No. 11,114,828.

(60) Provisional application No. 62/742,600, filed on Oct. 8, 2018.

(51) Int. Cl.
*H02G 3/00* (2006.01)
*H02G 3/08* (2006.01)
*H02G 3/14* (2006.01)

(52) U.S. Cl.
CPC .............. *H02G 3/081* (2013.01); *H02G 3/14* (2013.01)

(58) Field of Classification Search
CPC ................................. H02G 3/081; H02G 3/14
See application file for complete search history.

(56) References Cited

U.S. PATENT DOCUMENTS

| 4,134,516 A | 1/1979 | Sullo |
| 4,381,063 A | 4/1983 | Leong |
| 4,505,403 A | 3/1985 | Bowden, Jr. et al. |
| 4,660,912 A | 4/1987 | Tomek |
| 5,675,126 A | 10/1997 | Halvorsen |
| 6,417,450 B1 * | 7/2002 | Young .................... H02G 3/185 220/241 |
| 7,105,745 B2 | 9/2006 | Drane |
| 7,205,488 B2 | 4/2007 | Riner |
| 7,265,292 B2 | 9/2007 | Greenfield |

(Continued)

FOREIGN PATENT DOCUMENTS

| CN | 1771633 A | 5/2006 |
| CN | 102934289 A | 2/2013 |

OTHER PUBLICATIONS

International Search Report and Written Opinion, dated Dec. 23, 2019, received in International Patent Application No. PCT/US19/55148, 8 pages.

(Continued)

*Primary Examiner* — Pete T Lee
(74) *Attorney, Agent, or Firm* — Verrill Dana, LLP; Robert L. Hover

(57) ABSTRACT

An electrical receptacle cover, comprising a cover base, configured to be affixed to an electrical receptacle assembly. The cover base including a base surface having at least one opening configured to be aligned with an electrical receptacle of the electrical receptacle assembly. The cover base includes a base wall disposed about and extending from a perimeter of the base surface and the base surface and the base wall together define a base cavity. There is a cover lid interconnected with the cover base and it is moveable, via a hinge, from an open position, in which the base cavity is exposed, to a closed position in which the base cover is substantially disposed within the base cavity.

7 Claims, 9 Drawing Sheets

(56) References Cited

U.S. PATENT DOCUMENTS

| | | | |
|---|---|---|---|
| 7,667,145 B2* | 2/2010 | Dinh | H02G 3/14 174/53 |
| 8,410,363 B1 | 4/2013 | Baldwin et al. | |
| 9,831,648 B1 | 11/2017 | Gretz | |
| 9,935,436 B1 | 4/2018 | Baldwin | |
| 2008/0179072 A1 | 7/2008 | Drane et al. | |
| 2008/0264664 A1 | 10/2008 | Dinh et al. | |
| 2009/0014196 A1* | 1/2009 | Peck | H02G 3/185 174/67 |
| 2009/0194312 A1* | 8/2009 | Jolly | H02G 3/14 174/67 |
| 2009/0266574 A1 | 10/2009 | Atkinson et al. | |
| 2010/0000757 A1 | 1/2010 | Husain et al. | |
| 2015/0041467 A1 | 2/2015 | Thomas et al. | |
| 2020/0112154 A1 | 4/2020 | Mortun | |

OTHER PUBLICATIONS

First Office Action issued in corresponding CN application No. 201980074065.1 dated Feb. 18, 2022, with English Translation.

\* cited by examiner

ELECTRICAL RECEPTACLE COVER

CROSS-REFERENCE TO RELATED APPLICATIONS

This application is a Division of U.S. application Ser. No. 16/596,318, filed Oct. 8, 2019, entitled "ELECTRICAL RECEPTACLE COVER," allowed on May 4, 2021, which claims the benefit of priority to U.S. Provisional Application No. 62/742,600, filed Oct. 8, 2018, the contents of both applications are incorporated herein by reference in their entirety.

FIELD OF THE INVENTION

This disclosure generally relates to a cover for an electrical receptacle and more specifically to such a cover that provides an improved seal to increase waterproofing and limit the accumulation of contaminants, such as dirt and grass.

BACKGROUND OF THE INVENTION

Household electrical receptacles are often situated in outdoor locations to permit plugging in of various outdoor electrical appliances, such as electric weed trimmers, outdoor lighting, and other outdoor electrical equipment. These outdoor electrical receptacles are significantly more vulnerable to contamination from dirt, grass, water and other foreign matter than electrical receptacles located indoors. As a result, outdoor electrical receptacles are usually provided with some type of protective cover for preventing the entry of such contaminants.

One common type of outdoor cover is a metal cover that is hinged to a base and biased in a closed position by a spring. The outlet cover pivots from a closed position, covering the receptacles, to an open position, allowing access to the receptacles. The receptacles are typically flush with the base and when the cover is in the closed position it is located above the base with a bottom surface of the cover engaged with the base to cover the receptacle. The outer surface of the cover includes portions that are susceptible to the collection of contaminants and the bottom surface may not tightly seal the receptacles. The hinge is also located above the base and also has open portions where contaminants collect and water may enter. Thus, the cover may become dirty and require more frequent cleaning with water under pressure, which may infiltrate the receptacle through the cover of the hinge.

One such prior art electrical outlet cover assembly 10 is depicted in FIG. 1 and consists of a first lid 12, shown in a partially open position, and a second lid 14, shown in a closed position, both with respect to base plate 16. First lid 12 and second lid 14 include end portions 18 and 20, respectively, which are rotatably affixed to base plate 16 via hinge members 22 and 24. The hinge members 22 and 24 may have hinge pins (not shown) upon which end portions 18 and 20 are affixed and rotate. In some implementations, a single hinge pin may be used for both hinge members 22 and 24. In other implementations, multiple hinge pins may be used, one for each of hinge members 22 and 24. First lid 12 is used to cover aperture 26 in base plate 16 through which would be exposed an electrical receptacle when the electrical cover assembly 10 is installed on an outdoor electrical receptacle assembly. Second lid 14 is used to cover a second electrical receptacle (not shown).

The surface of the cover 16 includes portions that are susceptible to the collection of contaminants, such as where the lids 12 and 14 are in contact with the cover surface and near the apertures where the electrical receptacles are exposed, especially if the lids do not tightly seal the receptacles. Another area for contaminants to collect and water to enter is where the end portions 18 and 20 interconnect to the hinge members 22 and 24. As can be seen, there are gaps that are formed in both the open and closed positions in which contaminants may collect and water may enter both of which may infiltrate the receptacle. There is therefore a need for an improved receptacle cover, which improves waterproofing, limits the accumulation of contaminants, such as dirt and grass, and is easier to clean.

BRIEF DESCRIPTION OF THE INVENTION

In an embodiment of the invention, there is included an electrical receptacle cover, which includes a cover base, configured to be affixed to an electrical receptacle assembly. There is included a base surface having at least one opening configured to be aligned with an electrical receptacle of the electrical receptacle assembly. The cover base includes a base wall disposed about and extending from a perimeter of the base surface and the base surface and the base wall together define a base cavity. There is a cover lid interconnected with the cover base and is moveable, via a hinge, from an open position, in which the base cavity is exposed, to a closed position in which the base cover is substantially disposed within the base cavity.

In other aspects of the invention, one or more of the following features may be included. The cover base may be rectangular in shape and the base wall may comprise first and second opposing side wall segments and first and second opposing end wall segments. The hinge of the cover lid may be integrated within the first side wall segment and at least one recess may be formed in a top surface of the second opposing side wall segment. The at least one recess may be configured to receive a protrusion extending from an edge of the cover lid when the cover lid is in the closed position. The protrusion may be accessible by a user inserting a finger into the recess to lift the cover from the closed position to the open position. The cover lid may comprise two cover lid sections, and each cover lid section may be interconnected with the cover base. The cover lid sections may be independently moveable, via a hinge, from an open position, in which a respective portion of the base cavity is exposed, to a closed position, in which the cover lid section is substantially disposed within the respective portion of the base cavity. When the cover lid is in the closed position a top surface of the cover lid may be flush with the top surface of the second opposing side wall segment and a top surface of each of the first and second end walls.

In yet other aspects, one or more of the following features may be included. A portion of the first side wall segment may include at least one opening in which a first end of the hinge is disposed and the cover lid may include a portion which covers the at least one opening when the cover lid is in the closed position. When each of the two cover lid sections is in the closed position a top surface of each cover lid section may be flush with the top surface of the second opposing side wall segment and a top surface of one of the first and second end walls. A portion of the first side wall segment may include at least one opening for each of the two cover lid sections in which a first end of the hinge of the respective cover lid section is disposed and each of the cover lid sections may include a portion which covers the respective opening when the cover lid section is in the closed position. A portion of the first side wall segment may include a latch mechanism to receive and engage with a striker assembly on the cover lid when the cover lid is closed to secure it to the cover base. The latch mechanism may include a protrusion and the striker assembly may include a cavity and wherein when the lid is in the closed position, the protrusion of the catch assembly may be positioned in the cavity of the striker to secure the cover lid in the closed position.

BRIEF DESCRIPTION OF THE FIGURES

Embodiments of the present disclosure will now be described, by way of example only, with reference to the attached Figures, wherein.

DETAILED DESCRIPTION OF THE INVENTION

Figure 1:
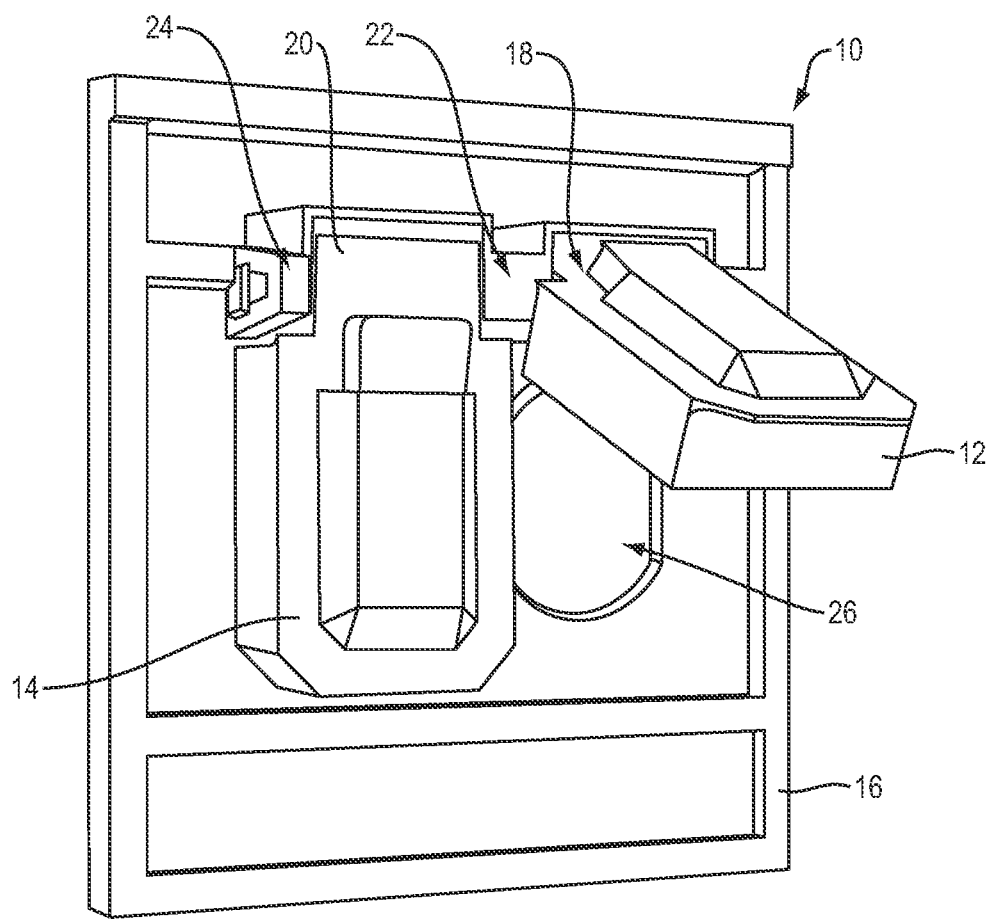
FIG. 1 shows a perspective view of a prior art electrical receptacle cover.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, as the skilled artisan would recognize, even if not explicitly stated herein.

Descriptions of well-known components and processing techniques may be omitted to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

An electrical receptacle cover assembly made of stainless-steel (or other suitable material) with single and double integrated lids is disclosed. The lids are sinked into the main body of the electrical receptacle cover assembly in order to create a smooth exterior surface that will be less likely to accumulate dirt and will be easier to clean than prior art receptacle covers, such as the one depicted in FIG. 1. The integrated lid design versus prior art models does not include exposed springs or lid mechanism parts, so it is less likely to accumulate dirt.

Figure 2A:
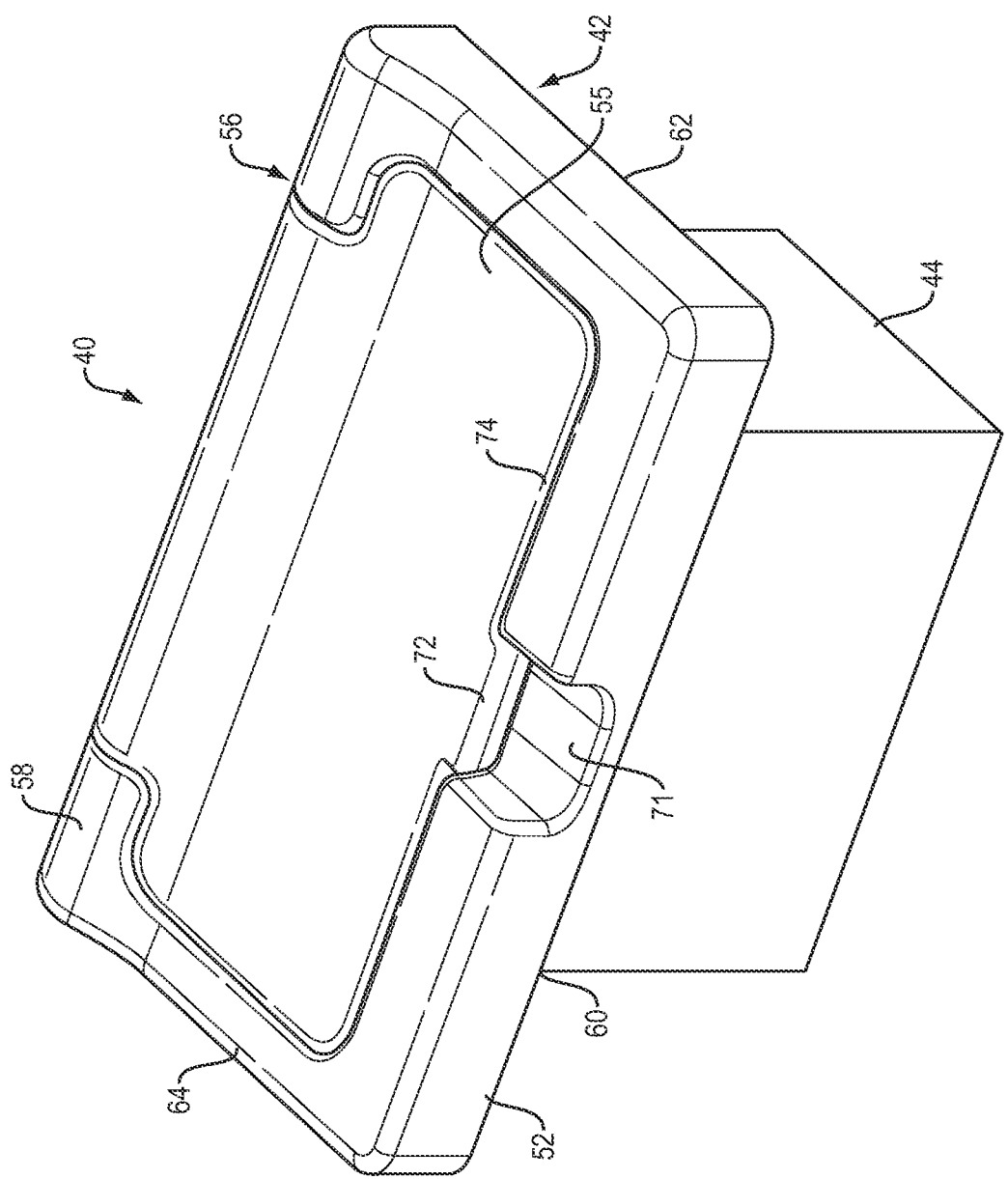
FIG. 2A shows perspective view of an embodiment of an electrical receptacle cover according to an aspect of the invention with a single lid in the closed position.
Figure 2B:
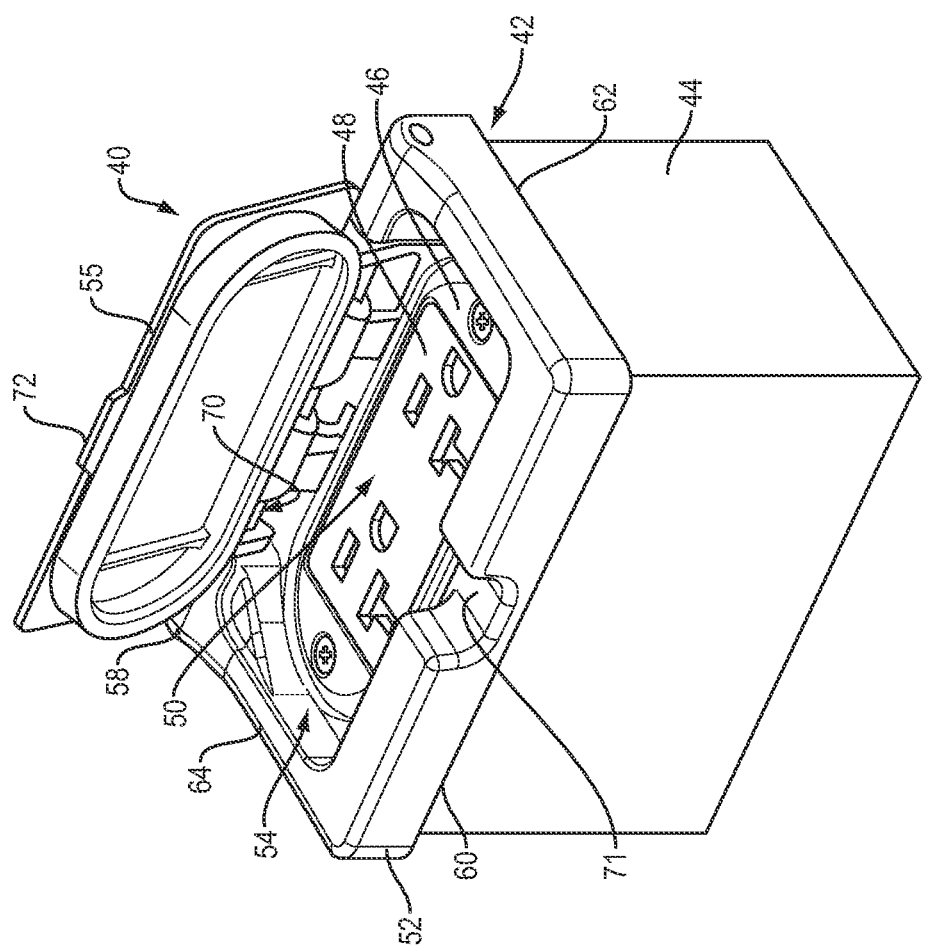
FIG. 2B shows a perspective view of the electrical receptacle cover of FIG. 2A with the single lid in the partially open position.

An electrical receptacle cover assembly 40, FIGS. 2A and 2B, according to an aspect of this invention, is shown in perspective view. Electrical receptacle cover assembly 40, may include a cover base 42, configured to be affixed to an electrical receptacle assembly 44. The cover base 42 may include a base surface 46 having at least one opening 48 configured to be aligned with an electrical receptacle 50 of the electrical receptacle assembly 40. The cover base 42 may include a base wall 52 disposed about and extending from a perimeter of the base surface 46. The base surface 46 and the base wall 52 together define a base cavity 54, which is on the interior of base wall 52. The electrical receptacle cover assembly 40 may also include a cover lid 55 interconnected with the cover base 42 and moveable, via a hinge 56, from an open position, in which the base cavity 54 is exposed (FIG. 2B), to a closed position in which the cover lid 55 is substantially disposed within the base cavity 54, as shown in FIG. 2A.

The cover base 42 may be rectangular in shape and the base wall 52 may comprise first 58 side wall segment and second side wall segment 60, which are in opposing relation to each other, and first end wall segment 64 and second end wall segment 66, which are in opposing relation to each other. The end and side wall segments may be interconnected in an integrated manner as shown and may be disposed about and extending from a perimeter of the base surface 46 to define the rectangular base cavity 54 on the interior of base wall 52. The cover lid 55 may also be rectangular in shape with slightly smaller dimensions than base cavity 54, such that when in the closed position, cover lid 55 fits snugly within the base cavity 54 with its top surface flush with the top surface side wall and end wall segments.

Continuing to refer to FIGS. 2A and 2B, hinge 56 of the cover lid 55 may be integrated within the first side wall segment 58 and include a spring mechanism 68, which is wound about a pin 70 at one end, and at a second end spring mechanism 68 may be affixed to the underside of cover lid 55. A portion of the first side wall segment 58 may include an opening in which a first end of spring mechanism 68 and pin 70 are disposed. The end portions of first side wall segment 58 may have curved exterior surfaces which extend above the surfaces of the other side wall segment 60 and the end wall segments 62 and 64 to accommodate the space required for pin 70 disposed within it. The cover lid 55 may also include a curved portion which covers the at least one opening and the pin 70 and spring mechanism 68 therein when the cover lid 55 is in the closed position.

The spring mechanism may be biased to keep cover lid 55 securely within cavity 54. In side wall segment 60 on a top surface thereof, there may be formed at least one recess 71 to receive a protrusion 72, extending partially into recess 71, from an edge 74 of the cover lid 55 when it is in the closed position. The protrusion 72 is accessible by a user inserting a finger into recess 71 to lift the cover lid 55 from the closed position to the open position.

Figure 3:
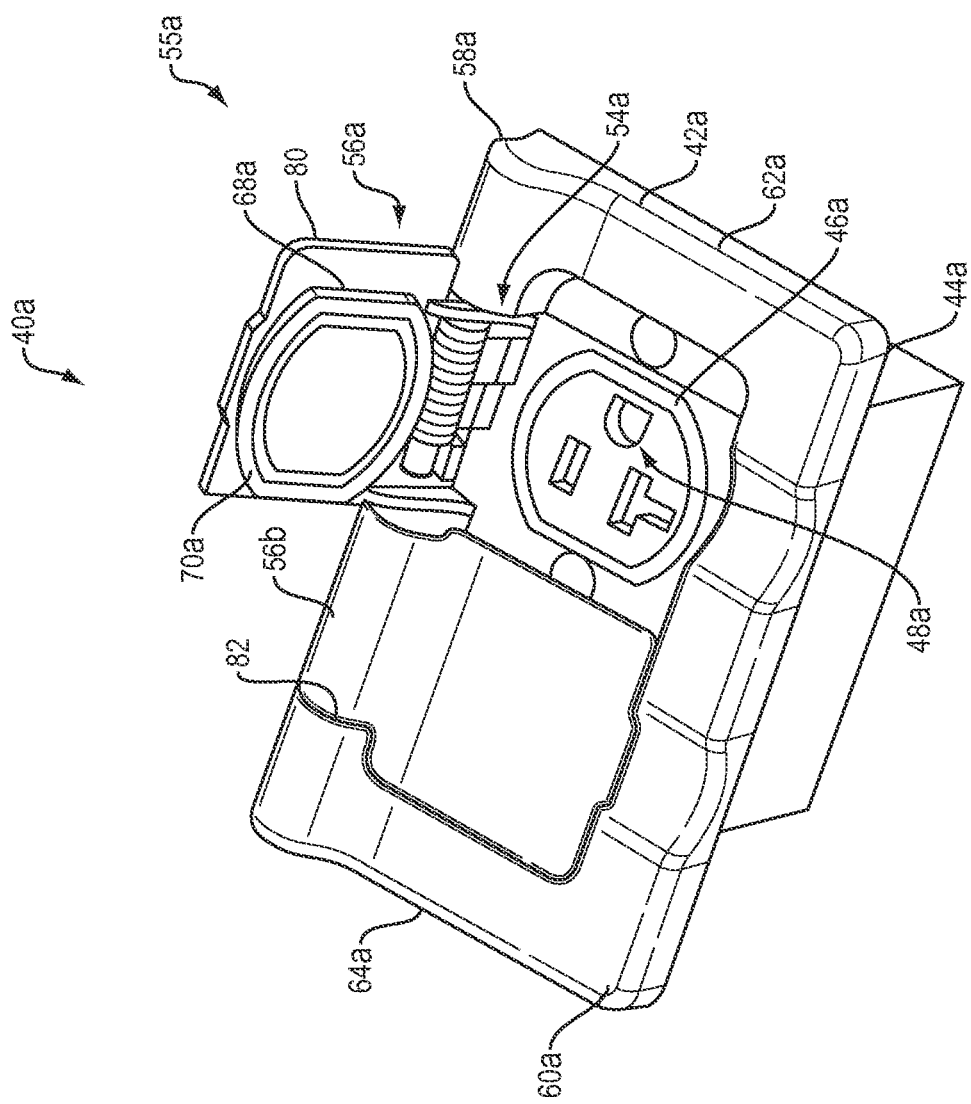
FIG. 3 shows perspective view of another embodiment of an electrical receptacle cover according to an aspect of the invention, with double integrated lids, one of which is in a partially open position.

In an alternative embodiment, electrical cover assembly 40a, depicted in FIG. 3, may include a cover lid 55a, which comprises two cover lid sections; namely first lid section 80, which is shown in a partially open position, and second lid section 82, which is shown in the closed position. Each cover lid section may be interconnected with the cover base 62a and independently moveable, via its respective hinge 56a/56b, from an open position, in which a respective portion of the base cavity is exposed, to a closed position, in which the cover lid section is substantially disposed within the respective portion of the base cavity.

Hinge 56a of the lid section 80 may be integrated within the first side wall segment 58a and include a spring mechanism 68a, which is wound about a pin 70a at one end, and at a second end spring mechanism 68a is affixed to the underside of lid section 80. As with the embodiment of FIG. 2, a portion of the first side wall segment 58a may include an opening in which a first end of spring mechanism 68a and pin 70a are disposed. Also, when each of the two cover lid sections 80 and 82 is in the closed position, a top surface of each cover lid section may be flush with the top surface of the second opposing side wall segment and a top surface of one of the first and second end walls. The end portions of first side wall segment 58a may have curved exterior surfaces which extend above the surfaces of the other side wall segment 60a and the end wall segments 62a and 64a to accommodate the space required for pin 70 disposed within it. The lid sections 80 and 82 may also include curved portions which cover the openings in side wall segment 58a and the pin 70a and spring mechanism 68a therein when in the closed position.

Figure 4A:
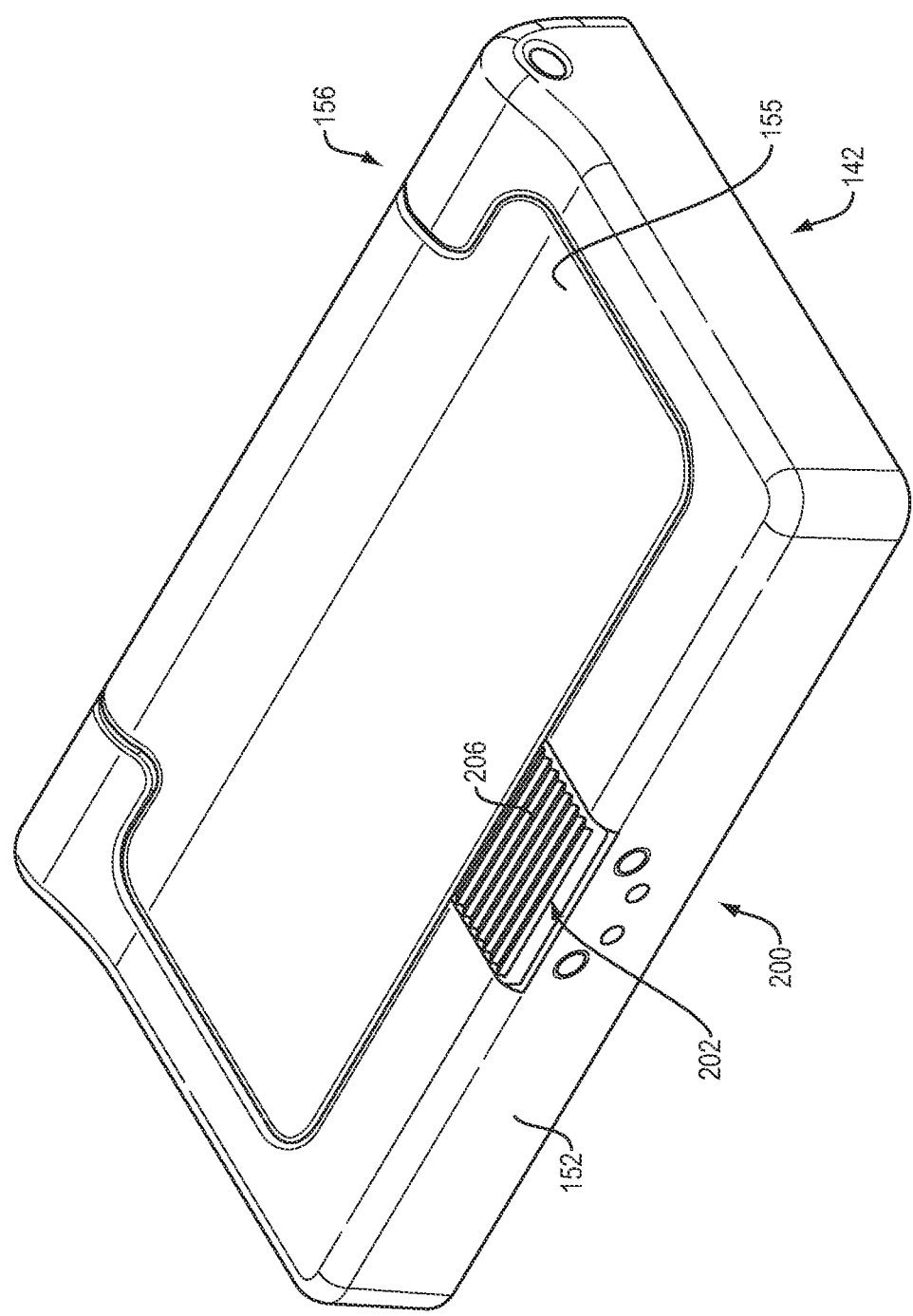
FIG. 4A shows front perspective view of the cover base of another embodiment of an electrical receptacle cover according to an aspect of the invention, with a locking mechanism, and cover lid in the closed and secured position.
Figure 4B:
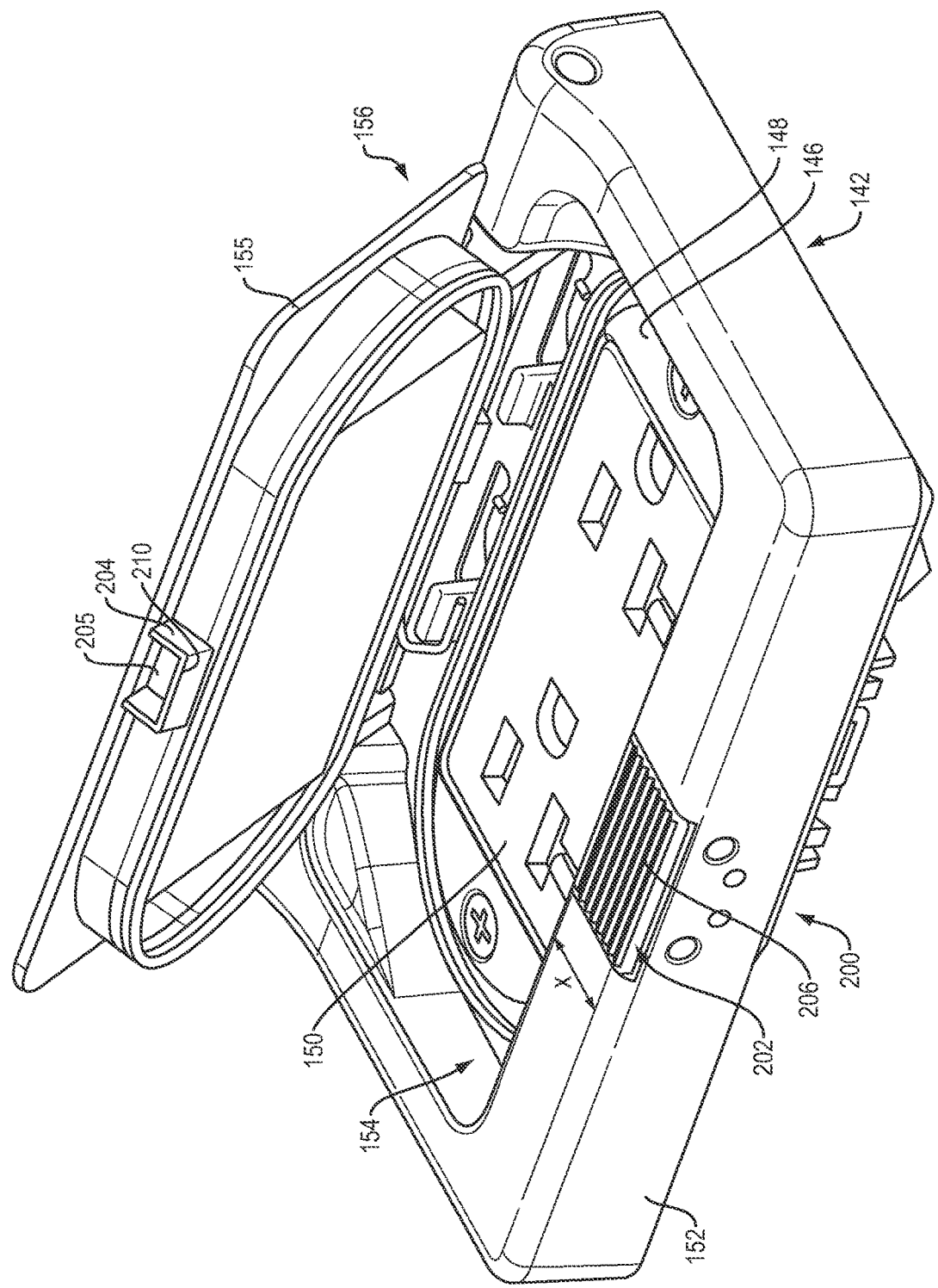
FIG. 4B shows a front perspective view of the cover base of FIG. 4A, with a locking mechanism, and with the cover lid in a partially open position.
Figure 5:
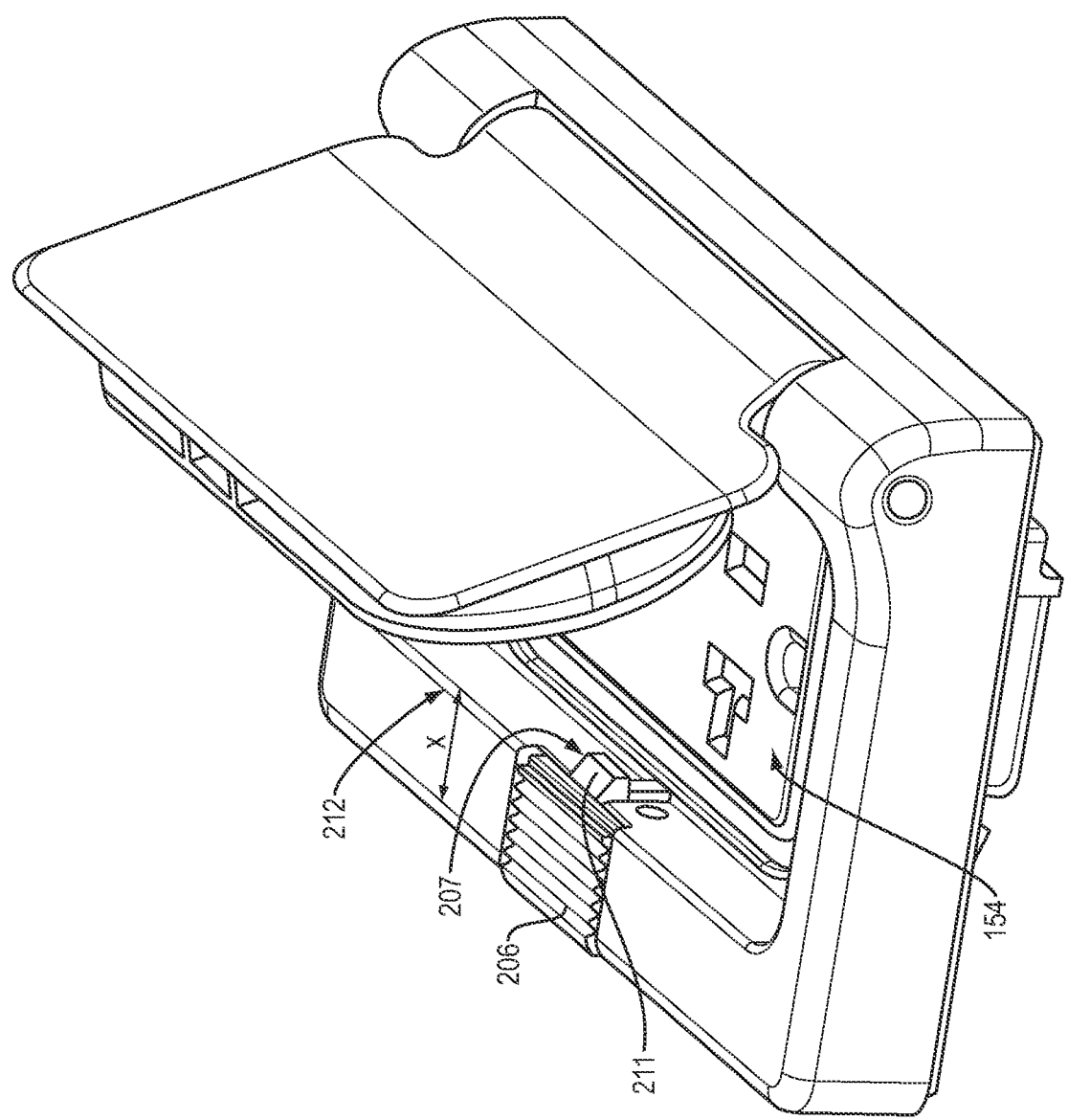
FIG. 5 shows a rear perspective view of the cover base of FIG. 4B, with a locking mechanism, and with the cover lid in a partially open position.

In another embodiment, a cover base 142 is shown in FIGS. 4A and 4B, which is configured to be affixed to an electrical receptacle assembly (not shown). The cover base 142 of embodiment is comparable to the cover base 42 shown in FIGS. 2A and 2B, except this embodiment includes a locking mechanism in order to ensure the cover lid remains closed even under high water pressure conditions. In describing this figure, like features will be described with like reference numerals, e.g. "42" for the base cover in FIGS. 2A/B and "142" for the base cover in FIGS. 4A/B.

The cover base 142 may include a base surface 146 (FIG. 4B) having at least one opening 148 configured to be aligned with an electrical receptacle 150 of the electrical receptacle assembly. The cover base 142 may include a base wall 152 disposed about and extending from a perimeter of the base surface 146. The base surface 146 and the base wall 152 together define a base cavity 154, which is on the interior of base wall 152. There may also be included a cover lid 155 interconnected with the cover base 142 and moveable, via a hinge 156, from an open position, in which the base cavity 154 is exposed (FIG. 4B), to a closed position in which the cover lid 155 is substantially disposed within the base cavity 154, as shown in FIG. 4A.

Figure 6A:
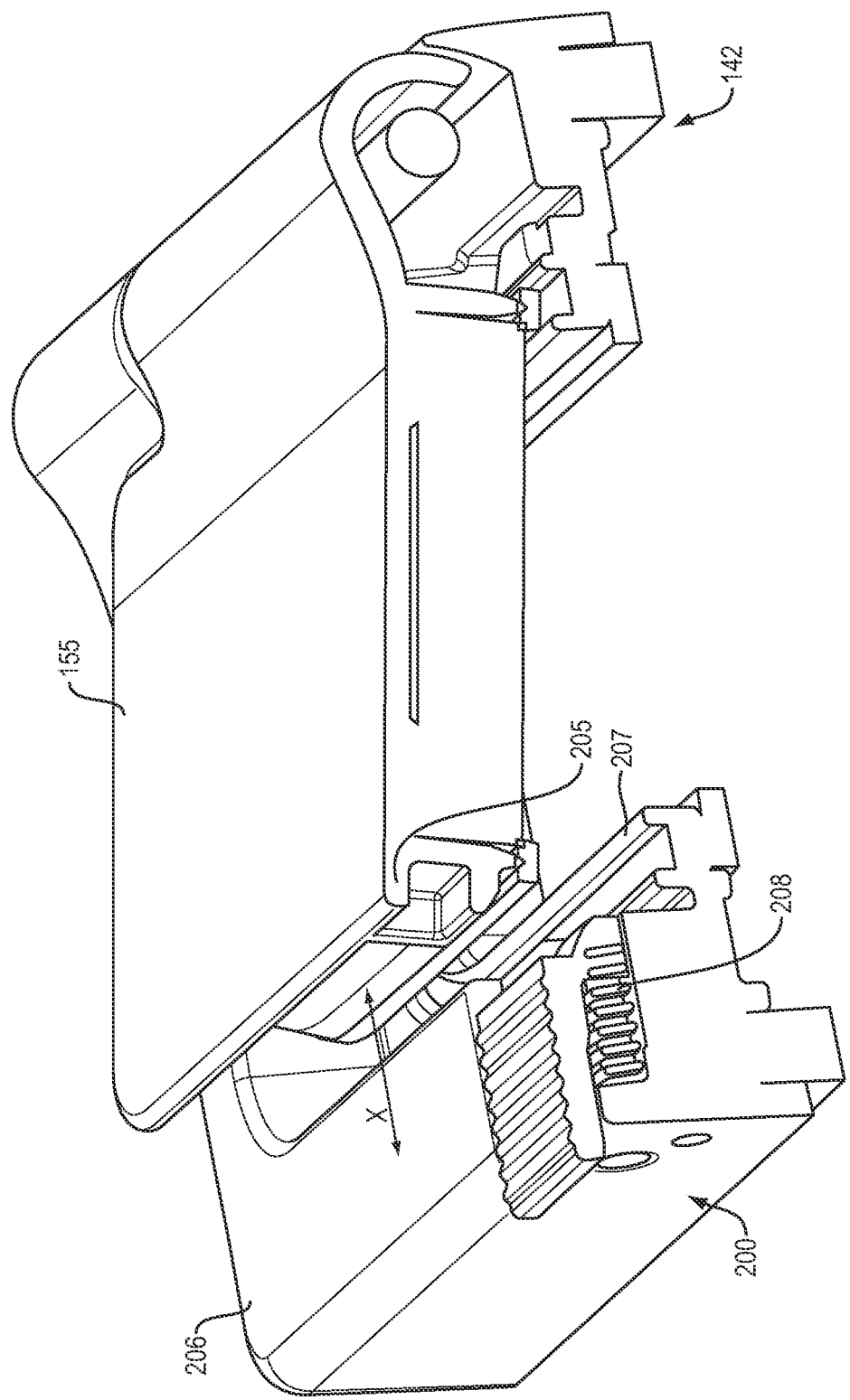
FIG. 6A shows front perspective view (in cross-section) of the cover base of and cover lid of FIGS. 4A and 4B with the cover lid in the partially open position.
Figure 6B:
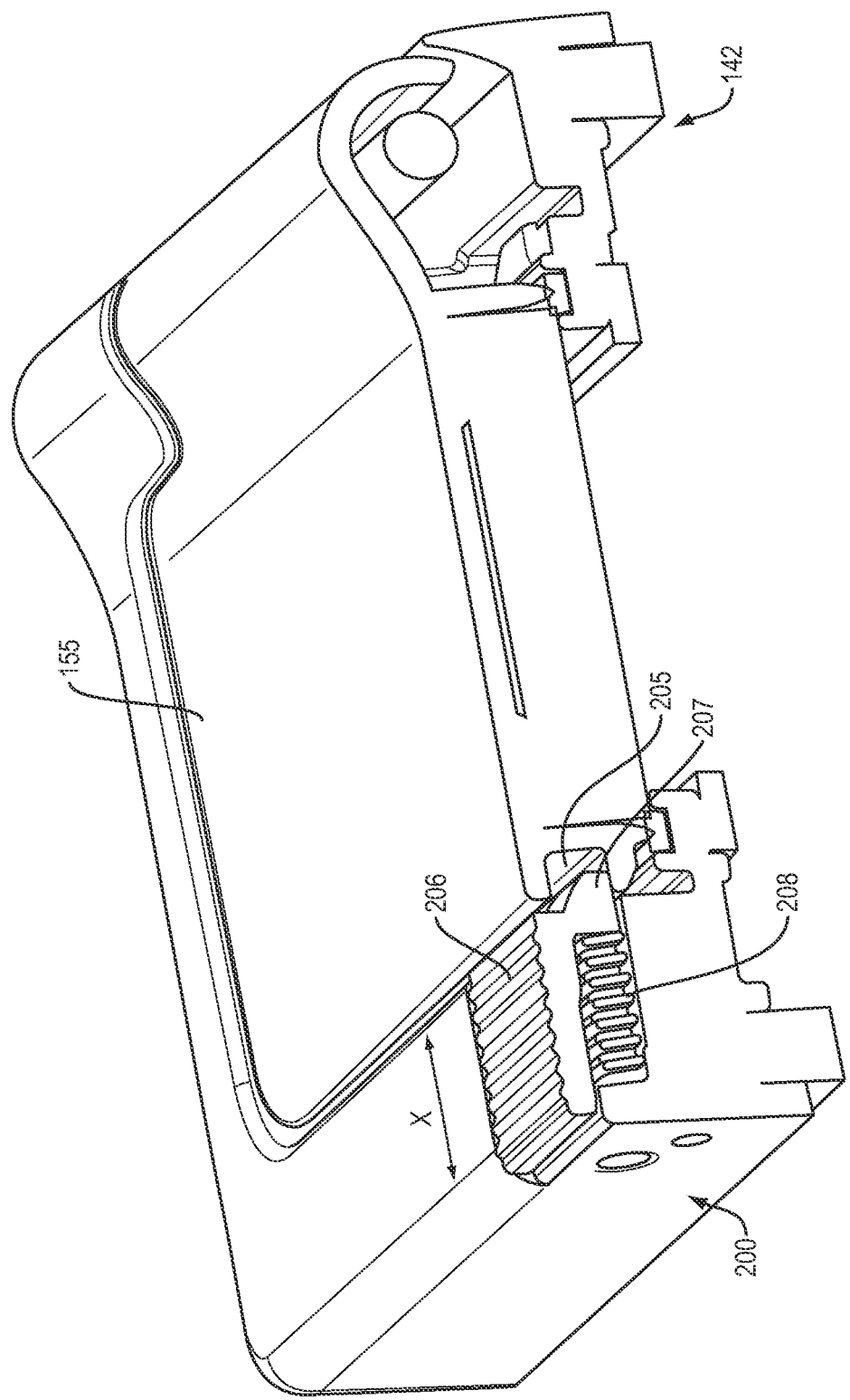
FIG. 6B shows front perspective view (in cross-section) of the cover base of and cover lid of FIGS. 4A and 4B with the cover lid in the closed position.

There is a lock mechanism 200, to secure lid 155 in the closed position. Lock mechanism 200 may include a catch assembly 202, which may engage with a striker 204 to secure lid 155 in a closed position on cover base 142. When lid 155 is in the closed position, ribbed surface 206 of catch assembly may be moved in a direction away from lid 155 along the X axis to release the striker 204 and allow lid 155 to open. Because lid 155 is biased by springs (not shown in these figures) to be in the open position when the striker 204 is released from the catch assembly 202, it may revert automatically to the open position. Catch assembly 202 may be biased via a spring mechanism 208 as depicted in FIGS. 6A and 6B, described below. Alternatively, neither the lid 155 nor the catch assembly 202 need to be biased via a spring mechanism and they may be manually moved by a user.

Striker 204 may include a cavity 205 which is configured to receive protrusion 207 on catch assembly 202 when lid 155 is closed. As lid 155 is closed, bottom surface 210 of striker 204 contacts angled top surface 211 of protrusion 207 and causes protrusion to retract into wall surface 212, along the X axis, against the bias of the spring mechanism 208. As the lid 155 continues to close, protrusion 207 eventually becomes aligned with cavity 205 on striker 204 and the spring mechanism 208 forces the protrusion 207 to move along the X axis and into the cavity 205 of striker 204, thereby securing the lid in the closed position. To open the lid 155, ribbed surface 206 of latch mechanism may be moved in a direction away from lid 155 along the X axis. This causes protrusion 207 to move out of cavity 205 of striker 204 and allows lid 155 to open as a result of the spring biasing lid 155 to the open position.

Referring to FIG. 6A, a cross-sectional view of cover base 142 with lid 155 nearly in the closed position. Ribbed surface 206 of catch assembly is shown in the extended position moved along the X axis away from lid 155. In this position the spring 208 is compressed and protrusion 207 is retracted into wall 212. As shown in FIG. 6B, when lid is fully closed, ribbed surface 206 of catch assembly is shown in the retracted or normal position moved along the X axis toward lid 155. In this position the spring 208 is extended and protrusion 207 is position in cavity 205 holding lid 155 in the secure position.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

I claim:

1. An electrical receptacle cover, comprising:
   a cover base, configured to be affixed to an electrical receptacle assembly, including a base surface having at least one opening configured to be aligned with an electrical receptacle of the electrical receptacle assembly; the cover base including a base wall disposed about and extending from a perimeter of the base surface; the base surface and the base wall together defining a base cavity;
   a cover lid interconnected with the cover base and moveable, via a hinge, from an open position, in which the base cavity is exposed, to a closed position in which the base cover is substantially disposed within the base cavity;
   wherein the cover base is rectangular in shape and the base wall comprises first and second opposing side wall segments and first and second opposing end wall segments;
   wherein a portion of the first side wall segment includes a catch assembly including:
   a movable member slidable perpendicular to the first side wall segment between a release position and a latch position; and
   a protrusion extending from the movable member toward the base cavity, wherein:

in the release position of the movable member the protrusion is at least partially retracted into the first side wall segment, and in the latch position of the movable member the protrusion at least partially extends out of the first side wall segment into the base cavity; and wherein the cover lid includes a striker assembly defining a cavity configured to receive the protrusion to secure the cover lid to the cover base when the cover lid is in the closed position and the movable member is in the latch position.

2. The electrical receptacle of claim 1, wherein the movable member is biased toward the latch position.

3. The electrical receptacle of claim 2, wherein the movable member is biased toward the latch position by a spring mechanism.

4. The electrical receptacle of claim 1, wherein the cover lid is biased toward the open position.

5. The electrical receptacle of claim 4, wherein the cover lid is biased toward the open position by a spring mechanism.

6. The electrical receptacle of claim 4, wherein when the cover lid is secured to the cover base, sliding the movable member from the latch position to the release position causes the cover lid to return to the open position.

7. The electrical receptacle of claim 1, wherein the movable member is slidable within a channel formed in the base surface adjacent the first side wall segment.

* * * * *